United States Patent
Altaf et al.

(10) Patent No.: US 12,481,791 B2
(45) Date of Patent: Nov. 25, 2025

(54) SECURE DATASTORE OF SEARCHABLE HETEROGENOUS GEOSPATIAL DATA

(71) Applicant: INTERNATIONAL BUSINESS MACHINES CORPORATION, Armonk, NY (US)

(72) Inventors: Naeem Altaf, Round Rock, TX (US); Colin Alstad, Charleston, SC (US); Minsik Lee, Fort Lee, NJ (US); Sowmya Janakiraman, Leander, TX (US)

(73) Assignee: International Business Machines Corporation, Armonk, NY (US)

(*) Notice: Subject to any disclaimer, the term of this patent is extended or adjusted under 35 U.S.C. 154(b) by 811 days.

(21) Appl. No.: 17/570,523

(22) Filed: Jan. 7, 2022

(65) Prior Publication Data

US 2023/0222248 A1    Jul. 13, 2023

(51) Int. Cl.
G06F 21/64    (2013.01)
G06F 16/29    (2019.01)
G06F 21/60    (2013.01)

(52) U.S. Cl.
CPC .............. *G06F 21/64* (2013.01); *G06F 16/29* (2019.01); *G06F 21/602* (2013.01)

(58) Field of Classification Search
CPC ......... G06F 21/64; G06F 16/29; G06F 21/602
See application file for complete search history.

(56) References Cited

U.S. PATENT DOCUMENTS

| | | | | |
|---|---|---|---|---|
| 11,366,836 | B2* | 6/2022 | Berthiaume | G06V 20/13 |
| 2009/0165116 | A1* | 6/2009 | Morris | G06F 21/6218 726/14 |
| 2012/0185950 | A1* | 7/2012 | Li | H04L 67/568 726/29 |

(Continued)

FOREIGN PATENT DOCUMENTS

WO    2018136996    8/2018

OTHER PUBLICATIONS

Kim, Taehoon et al., "Efficient Encoding and Decoding Extended Geocodes for Massive Point Cloud Data," Mar. 6, 2019, 9 pages.

(Continued)

*Primary Examiner* — Lynn D Feild
*Assistant Examiner* — Ethan V Vo
(74) *Attorney, Agent, or Firm* — Joseph P. Curcuru; Andrew D. Wright; Calderon Safran & Wright P.C.

(57) ABSTRACT

Systems and methods are provided for publishing immutable references to geospatial data. In embodiments, a method includes identifying geospatial data of a data provider, wherein the geospatial data is associated with a grid element of a discrete global grid (DGG); generating, in a grid element data store, an immutable reference in time to the geospatial data, the immutable reference including a pointer to a unique label of the grid element of the DGG and a storage location of the geospatial data; receiving a data request from a user, the data request including location information identifying the grid element; and providing a response to the user including the storage location of the geospatial data associated with the grid element to enable access of the geospatial data by the user, wherein the immutable reference provides a guarantee that the geospatial data is originating from the data provider.

20 Claims, 11 Drawing Sheets

(56) References Cited

U.S. PATENT DOCUMENTS

| | | | | |
|---|---|---|---|---|
| 2016/0124993 | A1* | 5/2016 | Watson | G06F 16/258 |
| | | | | 707/690 |
| 2017/0046199 | A1* | 2/2017 | Kramer | G06F 9/5083 |
| 2019/0073645 | A1* | 3/2019 | Dazin | G06Q 20/065 |
| 2020/0097491 | A1* | 3/2020 | Berthiaume | G06N 20/00 |
| 2020/0314589 | A1* | 10/2020 | Sheng | H04W 4/021 |
| 2020/0409905 | A1* | 12/2020 | Pillarick, III | G06F 11/3696 |
| 2022/0244056 | A1* | 8/2022 | Klingner | G06V 10/803 |
| 2022/0300537 | A1* | 9/2022 | Song | G06F 16/22 |

OTHER PUBLICATIONS

Ma, Ting et al., "A discrete square global grid system based on the parallels plane projection", International Journal of Geographical Information Science vol. 23, No. 10, Oct. 2009, 17 pages.

Yao, Xiaochuang et. al., "Enabling the Big Earth Observation Data via Cloud Computing and DGGS: Opportunities and Challenges," Remote Sensing, Dec. 23, 2019, 15 pages.

Sirdeshmukh, Neeraj et al., "Utilizing a Discrete Global Grid System for Handling Point Clouds with Varying Locations, Times, and Levels of Detail," Cartographica: The International Journal for Geographic Information and Geovisualization 54, No. 1, 2019, 12 pages.

Mell et al., "The NIST Definition of Cloud Computing", NIST, Special Publication 800-145, Sep. 2011, 7 pages.

\* cited by examiner

SECURE DATASTORE OF SEARCHABLE HETEROGENOUS GEOSPATIAL DATA

BACKGROUND

Aspects of the present disclosure relate generally to geospatial data, more particularly, to a secure datastore of searchable heterogenous geospatial data.

A discrete global grid (DGG) is a mosaic which covers the entire Earth's surface, and partitions the Earth's surface. The purpose of a DGG is to discretize the continuous surface of the Earth into addressable elements. In one grid-modeling strategy, each region of the Earth is represented by a point, and the grid is abstracted as a set of region-points, wherein each region or region-point is called a cell. When each cell of a grid is subject to a recursive partition, the result is a series of discrete global grids with progressively finer resolution, forming a hierarchical grid called a Hierarchical DGG.

SUMMARY

In a first aspect of the disclosure, there is a computer-implemented method including: identifying, by a computing device, geospatial data of a data provider, wherein the geospatial data is associated with a grid element of a discrete global grid (DGG); generating, by the computing device, in a grid element data store, an immutable reference in time to the geospatial data, the immutable reference including a pointer to a unique label of the grid element of the DGG and a storage location of the geospatial data; receiving, by the computing device, a data request from a user, the data request including location information identifying the grid element; and providing, by the computing device, a response to the user including the storage location of the geospatial data associated with the grid element to enable access of the geospatial data by the user, wherein the immutable reference provides a guarantee that the geospatial data is originating from the data provider.

In another aspect of the disclosure, there is a computer program product including one or more computer readable storage media having program instructions collectively stored on the one or more computer readable storage media. The program instructions are executable to: identify geospatial data of a data provider, wherein the geospatial data is associated with a grid element of a discrete global grid (DGG); generate in a grid element data store, an immutable reference in time to the geospatial data, the immutable reference including: a pointer to a unique label of the grid element of the DGG, a storage location of the geospatial data, a public key of the data provider, and a checksum of the geospatial data generated by the data provider and signed with a private key of the data provider; receive a data request from a user, the data request including location information identifying the grid element; and provide a response to the user including the storage location of the geospatial data associated with the grid element to enable access of the geospatial data by the user, wherein the immutable reference provides a guarantee that the geospatial data is originating from the data provider.

In another aspect of the disclosure, there is system including a processor, a computer readable memory, one or more computer readable storage media, and program instructions collectively stored on the one or more computer readable storage media. The program instructions are executable to: generate a discrete global grid (DGG) by creating a mathematical partition of the Earth's surface into discrete grid elements; assign unique labels to each of the grid elements; identify geospatial data of a data provider, wherein the geospatial data is associated with a grid element of the DGG; generate in a grid element data store, an immutable reference in time to the geospatial data, the immutable reference including: a pointer to a unique label of the grid element of the DGG, a storage location of the geospatial data, a public key of the data provider, and a checksum of the geospatial data generated by the data provider and signed with a private key of the data provider; receive a data request from a user, the data request including location information identifying the grid element; and provide a response to the user including the storage location of the geospatial data associated with the grid element to enable access of the geospatial data by the user, wherein the immutable reference provides a guarantee that the geospatial data is originating from the data provider.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

DETAILED DESCRIPTION

Figure 1:
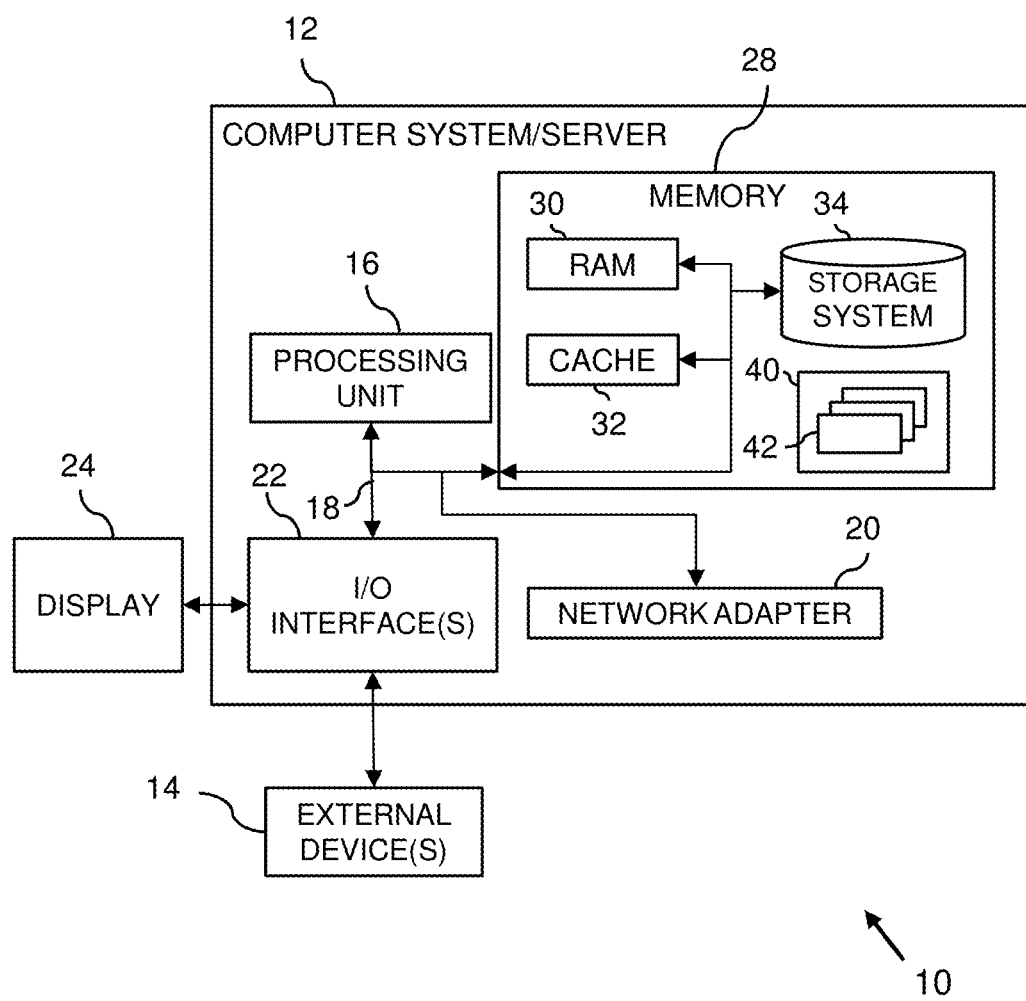
FIG. 1 depicts a cloud computing node according to an embodiment of the present disclosure.

Aspects of the present disclosure relate generally to geospatial data, more particularly, to a secure datastore of searchable heterogenous geo spatial data. According to aspects of the disclosure, a discrete global grid (DGG) is generated, wherein a unique identifier is assigned to every grid element, allowing for formation of a hierarchical DGG (HDGG). In implementations, a system stores references to data associated with an HDGG element, where the references are immutable in time such that changes to the stored data are prevented. In aspects, the system generates responses to user queries by fusing diverse types or categories of data associated with a HDGG element.

In implementations, a system is provided for securely storing geospatial data and performing heterogeneous data fusion. In embodiments the system includes: a) a first component configured to: create a partition of the entire Earth's surface into a DGG (e.g., using a projection function, such as Mercator), where each point on the Earth is contained in one and only one grid element; assign a unique identifier to every grid element (e.g., using x and y coordinates of the top left corner of the grid element); and allow for the formation of a HDGG by allowing an address to reference multiple base grid elements; b) a second component configured to store immutable references in time to data concerning a HDGG grid element in order to guarantee that the data accessed has not changed since it was published and that the data is originating from the claimed source; and c) a third component configured to fuse data of heterogeneous type (e.g., different types of data, such as satellite imagery and property records) to provide unique insights about a HDGG grid component (e.g., using a neural network).

In some embodiments, fusing the data to provide unique insights comprises performing one or more of: 1) combining satellite imagery and textual property records to identify buildings and more accurately estimate real estate value; 2) combining hyperspectral remote sensing data, in situ temperature and soil moisture data, and textual bills of sale to predict the expected yield and profit of a farming plot; and 3) combining synthetic aperture radar data, automatic identification system (AIS) data, and textual reports from observers to determine if a ship is taking part in prohibited fishing activities.

Finding, verifying the provenance of, analyzing, and combining disparate types of data for a given geographical area of interest (AoI) is a daunting task and one for which an integrated solution does not exist. In embodiments, a system is provided that uses permanent and discrete addresses for every spot on the globe to provide immutable references to data about these addresses, along with a way to fuse all of the diverse types of data into a coherent picture. Implementations of the disclosure have advantages over other geospatial databases. For example, the SpatioTemporal Asset Catalog (STAC) project provides a common language to describe a range of geospatial information, so the information can be indexed and discovered. The STAC project focuses on a data asset versus an AoI; does not provide mechanisms for verifying the source of data; does not provide mechanisms for verifying that data has remained unchanged; focuses on quantitative data and eschews qualitative data; and does not provide a mechanism for combining different data sets in a meaningful way in space or time for a given AoI. While there are benefits to aggregating geospatial data from different parties in single searchable database, the overall quality of query results may be questioned when there is no mechanism for trusting the source or integrity of the geospatial data relied on.

Advantageously, implementations of the disclosure utilize a DGG grid element as the atomic unit (e.g., as opposed to a data asset), and provide immutable references to geospatial data associated with the grid element. With a focus on AoIs, embodiments of the disclosure provide a built-in and robust geospatial index of data assets for a DGG grid element. In contrast, for systems that utilize a data asset as an atomic unit, it is nontrivial to determine which data assets reference which geographic AoI. Moreover, systems such as the STAC project are mutable (liable to change), and thus can be changed by data providers and system administrators, which opens such systems up to unstable analysis pipelines. In contrast, embodiments of the disclosure enable users to verify that stored data has not been changed since it was published to the system.

It is to be understood that the aforementioned advantages, as well as other advantages described herein, are example advantages and should not be construed as limiting. Embodiments of the present disclosure can contain all, some, or none of the advantages while remaining within the spirit and scope of the present disclosure.

It should be understood that, to the extent implementations of the disclosure collect, store, or employ personal information provided by, or obtained from, individuals (for example, personal information associated with property records), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
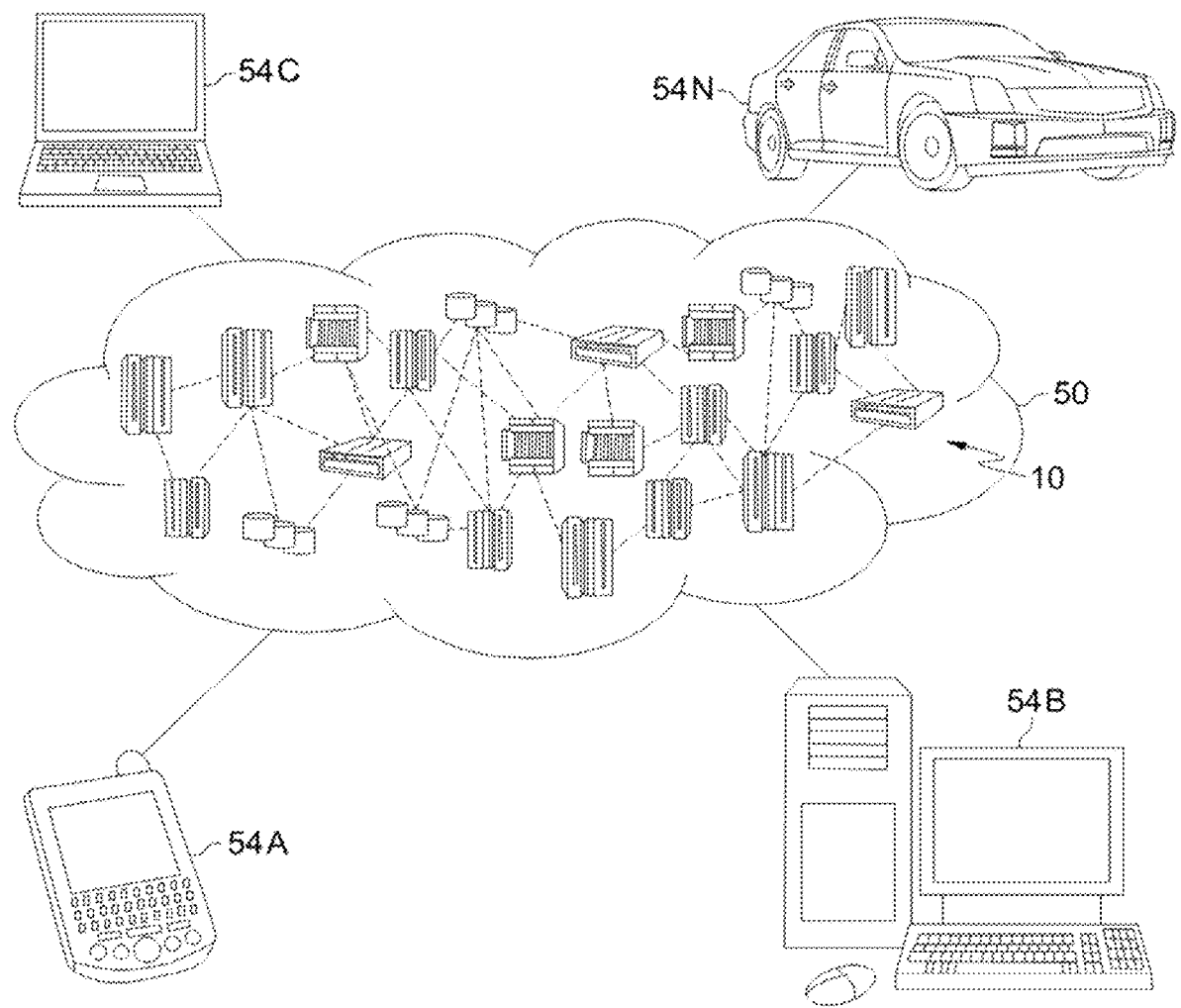
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
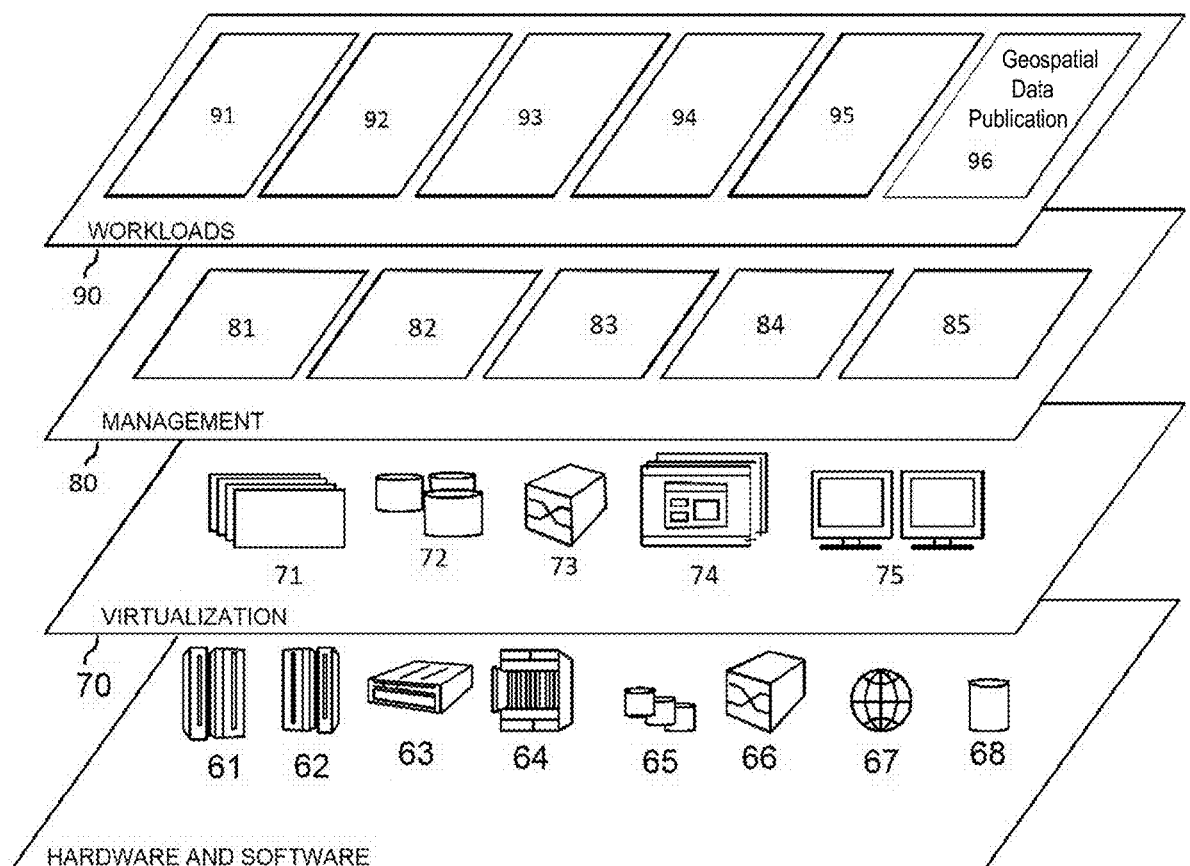
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and geospatial data publication 96.

Implementations of the disclosure may include a computer system/server 12 of FIG. 1 in which one or more of the program modules 42 are configured to perform (or cause the computer system/server 12 to perform) one of more functions of the geospatial data publication 96 of FIG. 3. For example, the one or more of the program modules 42 may be configured to: generate a discrete global grid (DGG) by creating a mathematical partition of the Earth's surface into discrete grid elements; assign unique labels to each of the grid elements; identify geospatial data of a data provider, wherein the geospatial data is associated with a grid element of the DGG; generate in a grid element data store, an immutable reference in time to the geospatial data, the immutable reference including: a pointer to a unique label of the grid element of the DGG, a storage location of the geospatial data, a public key of the data provider, and a checksum of the geospatial data generated by the data provider and signed with a private key of the data provider; receive a data request from a user, the data request including location information identifying the grid element; and provide a response to the user including the storage location of the geospatial data associated with the grid element to enable access of the geospatial data by the user, wherein the immutable reference provides a guarantee that the geospatial data is originating from the data provider.

Figure 4:
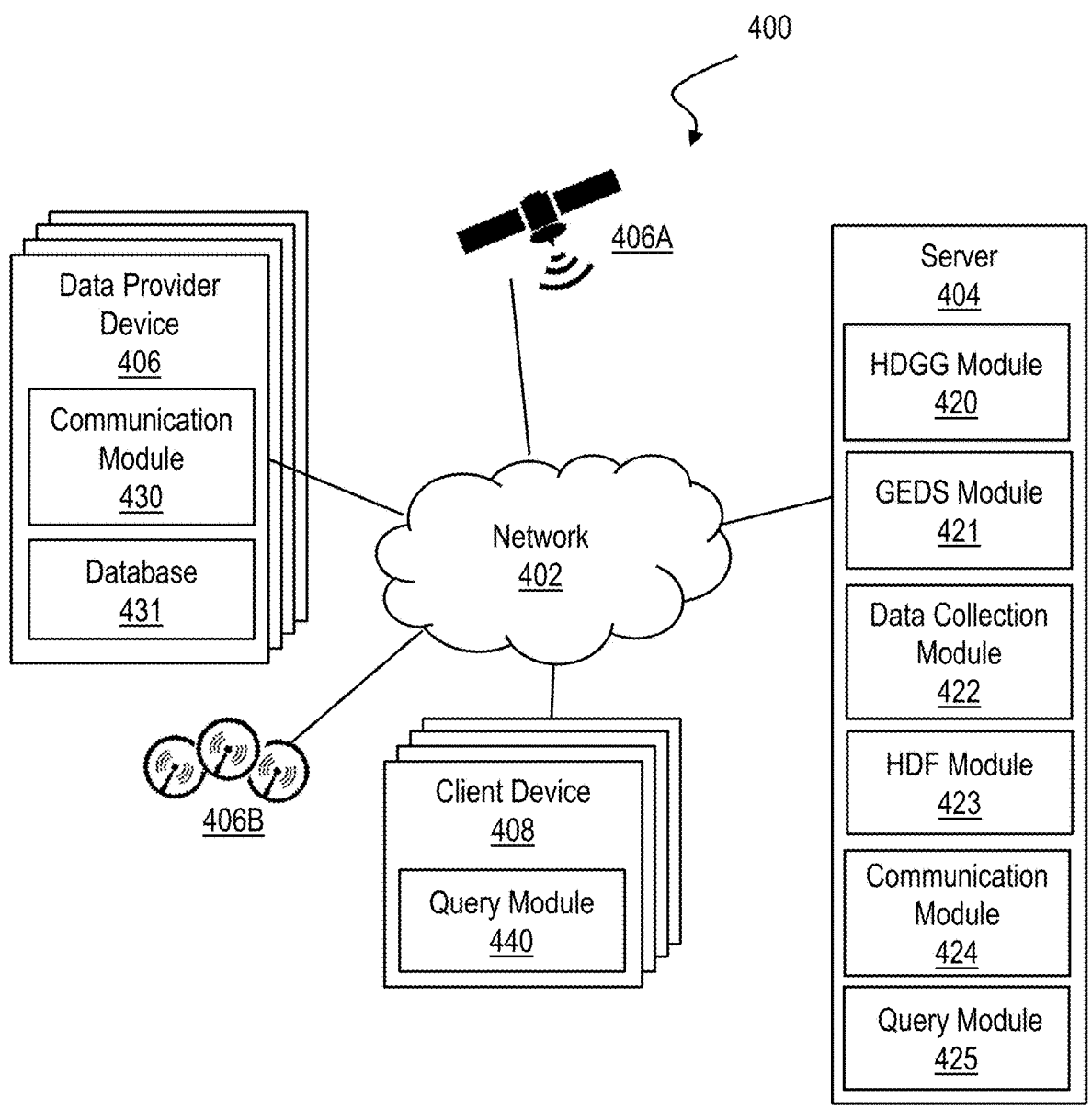
FIG. 4 shows a block diagram of an exemplary environment in accordance with aspects of the disclosure.

FIG. 4 shows a block diagram of an exemplary environment 400 in accordance with aspects of the disclosure. In embodiments, the environment 400 includes a network 402 enabling communication between a server 404, one or more data provider devices 406 and one or more client devices 408. The server 404, one or more data provider devices 406 and one or more client devices 408 may each comprise the computer system/server 12 of FIG. 1, or elements thereof. The one or more data provider devices 406 and/or the server 404 may be computing nodes 10 in the cloud computing environment 50 of FIG. 2. In implementations, the server 404 comprises a special purpose computing device configured to provide geospatial data publication, management, and query services to users of the network 402 in accordance with methods discussed herein. The one or more client devices 408 may be local computing devices used by cloud consumers in the cloud computing environment 50 of FIG. 2 (e.g., PDA or cellular telephone 54A, desktop computer 54B, laptop computer 54C, and/or automobile computer system 54N).

In embodiments, the server 404 comprises one or more modules, each of which may comprise one or more program modules such as program modules 42 described with respect to FIG. 1. In the example of FIG. 4, the server 404 includes a Hierarchical DGG (HDGG) module 420, a grid element data storage (GEDS) module 421, a data collection module 422, a heterogeneous data fusor (HDF) module 423, a communication module 424, and a query module 425, each of which may comprise one or more program module(s) 42 of FIG. 1, for example.

In implementations, the HDGG module 420 is configured to create a partition of the entire surface of the Earth into a Discrete Global Grid (DGG), where each point on the Earth is contained in one and only one grid element. The DGG discretizes the continuous surface of the Earth into addressable elements that can then be used to create persistent and permanent addresses. In embodiments, the HDGG module 420 is further configured to assign a unique identifier to every grid element and enabling the formation of a Hierarchical DGG (HDGG) by allowing for an address of a particular geographic area or areas of interest (AoIs) (e.g., a business, a farm, etc.) to reference multiple base grid elements.

In embodiments, the GEDS module 421 is configured to store immutable references in time to data concerning a HDGG grid element in a data store (e.g., a grid element data storage (GEDS). This guarantees that data accessed by users has not changed since it was published to the server 404, and that the data is originating from the indicated data source (e.g., data provider device 406).

In implementations, the data collection module 422 is configured to collected data of diverse types (heterogenous data) from one or more data sources (e.g., data provider device 406). In embodiments, the HDF module 423 is configured to fuse data of heterogeneous types in response to a user query in order to provide unique insights about a HDGG grid component.

In embodiments, the communication module 424 is configured to provide a user interface for clients/users within the environment 400. In implementations, the communication module 424 provides data verification options and search query options.

In implementations, the query module 425 is configured to receive search queries from users, generate results to the search queries, and send the results to the users in response to the search queries. Search queries may comprise results determined by the server 404, links to existing data referenced by the server 404, or the data itself. In implementations, the query module 425 performs verification operations to verify geospatial data upon request.

In embodiments, the data provider device 406 comprises one or more modules, each of which may comprise one or more program modules such as program modules 42 described with respect to FIG. 1. In the example of FIG. 4, the data provider device 406 includes a communication module 430 configured to enable a user to communicate with the server 404 (e.g., via a UI provided by the server 404), which may comprise one or more modules (e.g., program modules 42 of FIG. 1). Additionally, the example of FIG. 4 shows a database 431 configured to store data (e.g., sensor data, satellite data, or other geospatial data). In one example, a data provider device is a satellite device 406A providing satellite data to the server 404, and/or to users of the server 404 (e.g., via references to the data provided by the server 404). In another example, a data provider device comprises one or more sensors 406B providing sensor data to the server 404 and/or to users of the server 404.

In embodiments, the one or more client devices 408 comprises one or more modules, each of which may comprise one or more program modules such as program modules 42 described with respect to FIG. 1. In the example of FIG. 4, the client device 408 includes a query module 440 (e.g., comprising program module(s) 42 of FIG. 1) configured to receive data query inputs from a user and provide the data to the query module 425 of the server 404.

The server 404, the one or more data provider devices 406, and the one or more client device 408 may each include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment 400 may include additional devices and/or networks; fewer devices and/or networks; different devices and/or networks; or differently arranged devices and/or networks than illustrated in FIG. 4.

Figure 5:
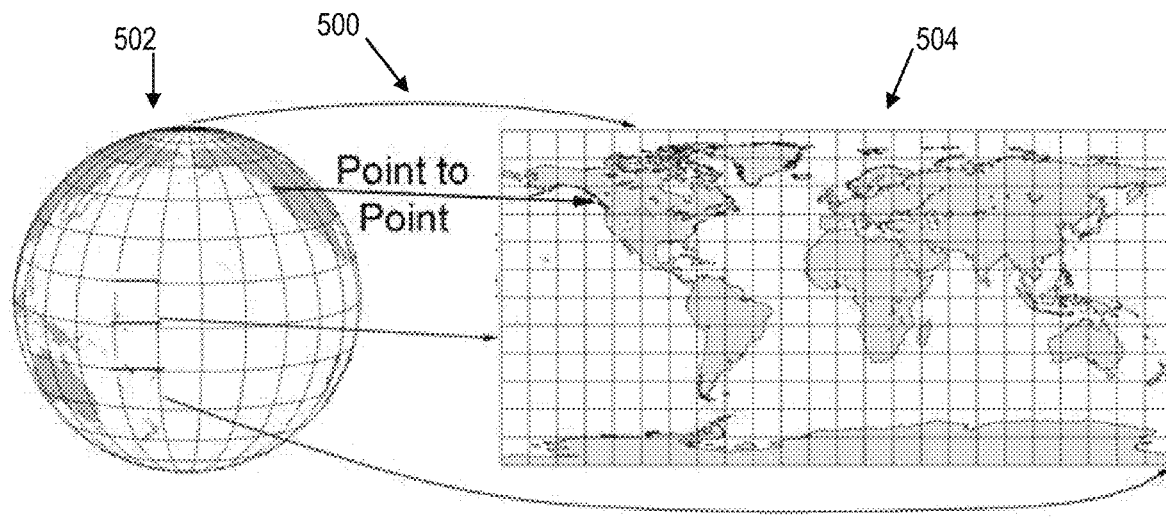
FIG. 5 illustrates the generation of a Discrete Global Grid (DGG) according to aspects of the disclosure.

FIG. 5 illustrates the generation of a Discrete Global Grid (DGG) according to aspects of the disclosure. Operations illustrated in FIG. 5 may be conducted in the environment of FIG. 4. In implementations, the server 404 discretizes at 500 the continuous surface of the Earth 502 into addressable grid elements (represented by horizontal and vertical lines at 504).

Figure 6:
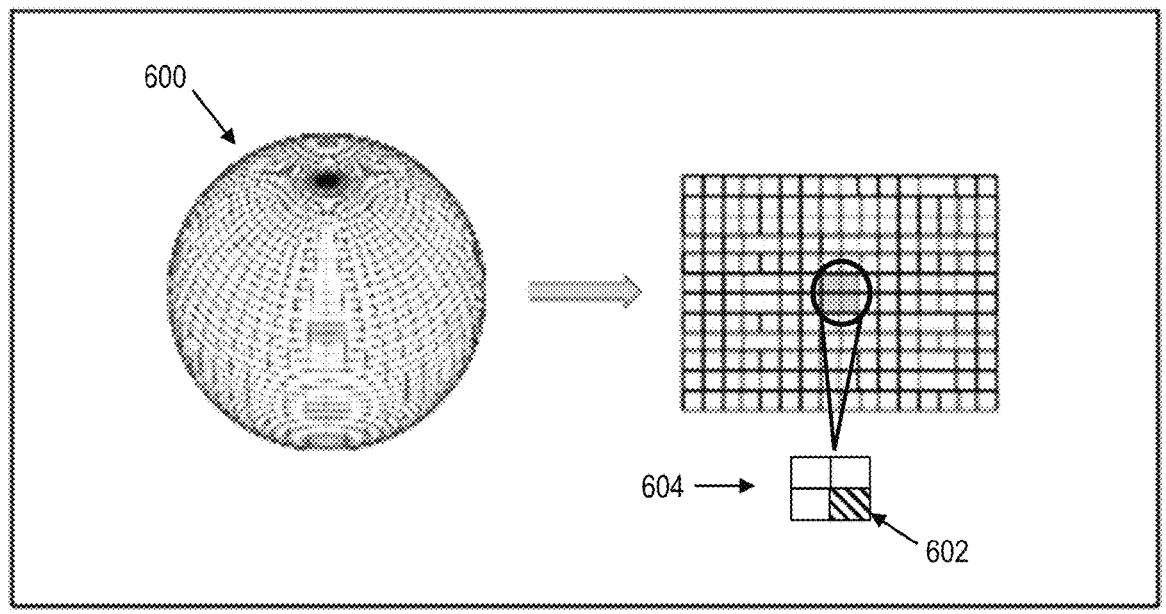
FIG. 6 depicts grid elements of a DGG according to aspects of the disclosure.

FIG. 6 depicts grid elements of a DGG 600 according to aspects of the disclosure. The DGG 600 comprises discrete grid elements, such that any point on the Earth (globe) is contained in one and only one grid element. One such grid element is represented at 602. In implementations, the server 404 associates an address for a particular AoI with a combination of grid elements (represented at 604).

Figure 7:
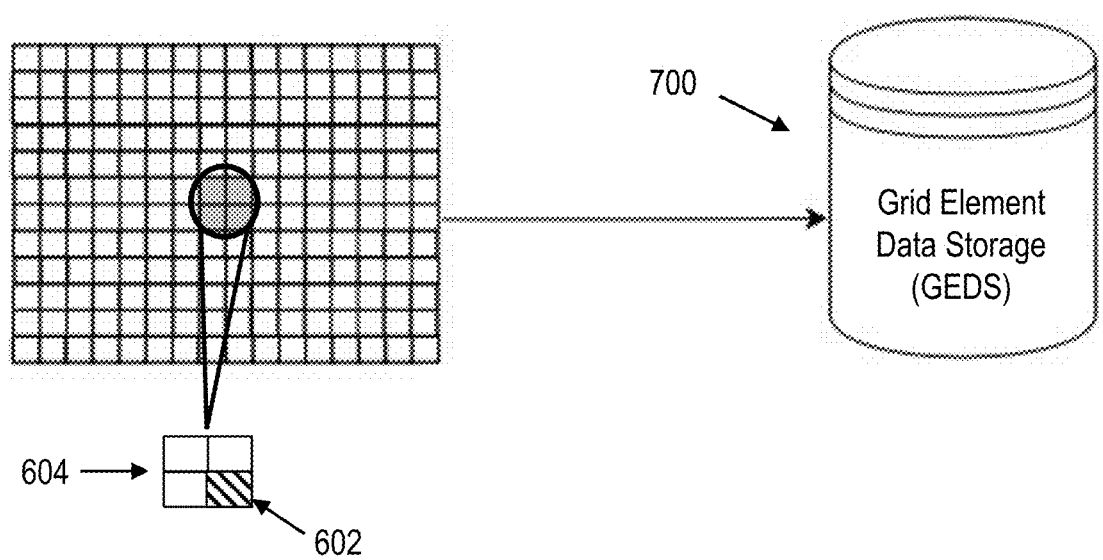
FIG. 7 illustrates registration of DGG grid element addresses according to aspects of the disclosure.

FIG. 7 illustrates registration of DGG grid element addresses according to aspects of the disclosure. Operations illustrated in FIG. 7 may be conducted in the environment of FIG. 4. In embodiments, the server 404 assigns each grid element (e.g., grid element 602) a unique label called an address, such that, given the latitude and longitude of a point on the Earth, the address of the grid element containing the given point can be determined by the server 404. In implementations, all addresses are stored in a grid element data storage (GEDS) 700 by the GEDS module 421 of the server 404. Additionally, in implementations, the server 404 assigns addresses to respective AoIs comprised of multiple grid elements (e.g., grid elements 604).

Figure 8:
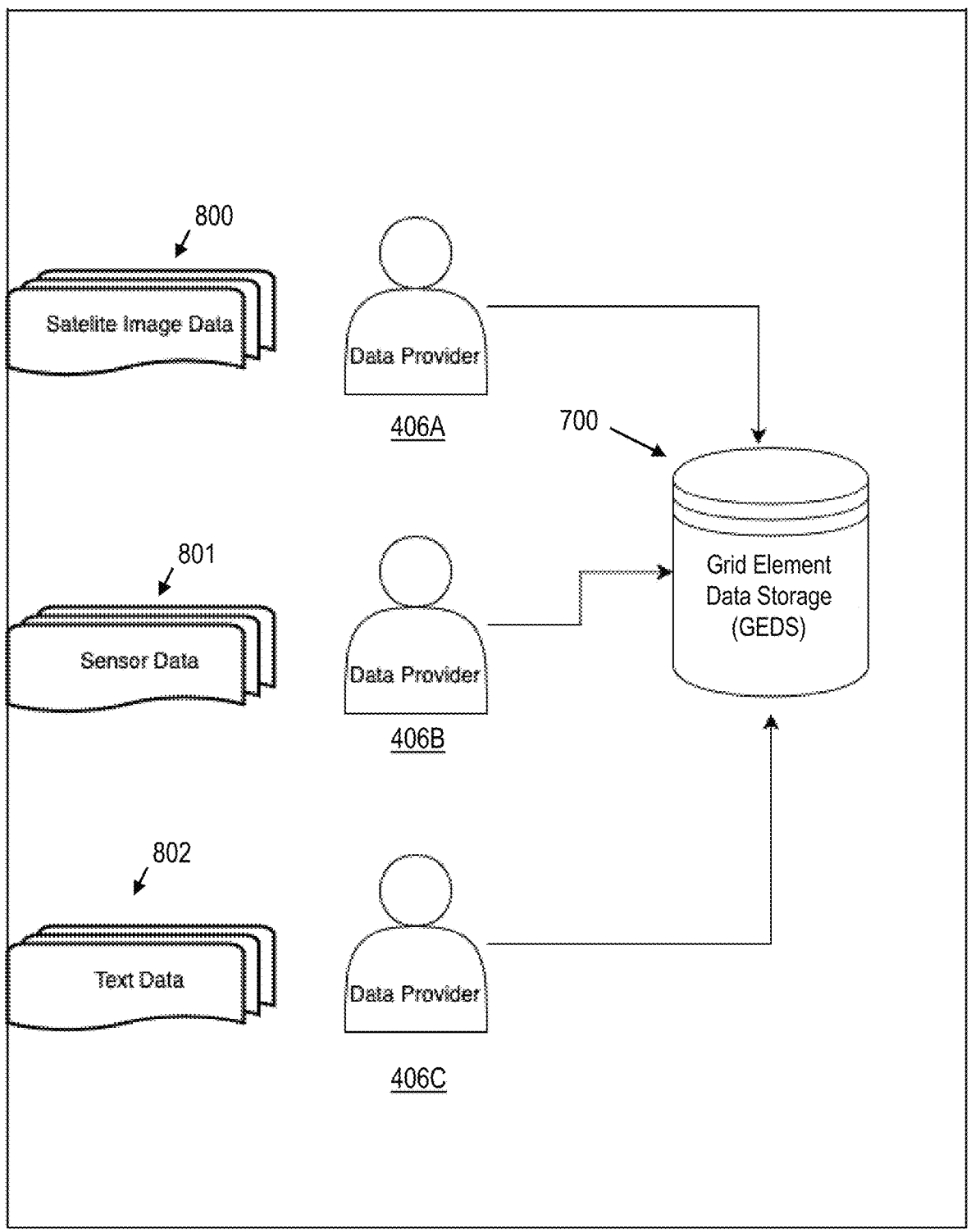
FIG. 8 illustrates data providers linked to DGG addresses according to aspects of the disclosure.

FIG. 8 illustrates data providers linked to DGG addresses according to aspects of the disclosure. Operations illustrated in FIG. 8 may be conducted in the environment of FIG. 4. In implementations, the GEDS 700 stores references to heterogenous data from multiple data providers (e.g., 406A-406C). By way of example, the GEDS 700 may enable users access to satellite image data 800, sensor data 801, and text data 802. In embodiments, the server 404 links DGG addresses to geospatial data provided by one or more data providers (e.g., 406A-406C), and saves the links in the GEDS 700. In implementations, the links are stored in a GEDS 700 by the GEDS module 421 of the server 404. In embodiments, data references are also stored in the GEDS 700, wherein the data references may be provided to users to enable the users to obtain the data from the data providers directly, or from a data store of the server 404.

Figure 9:
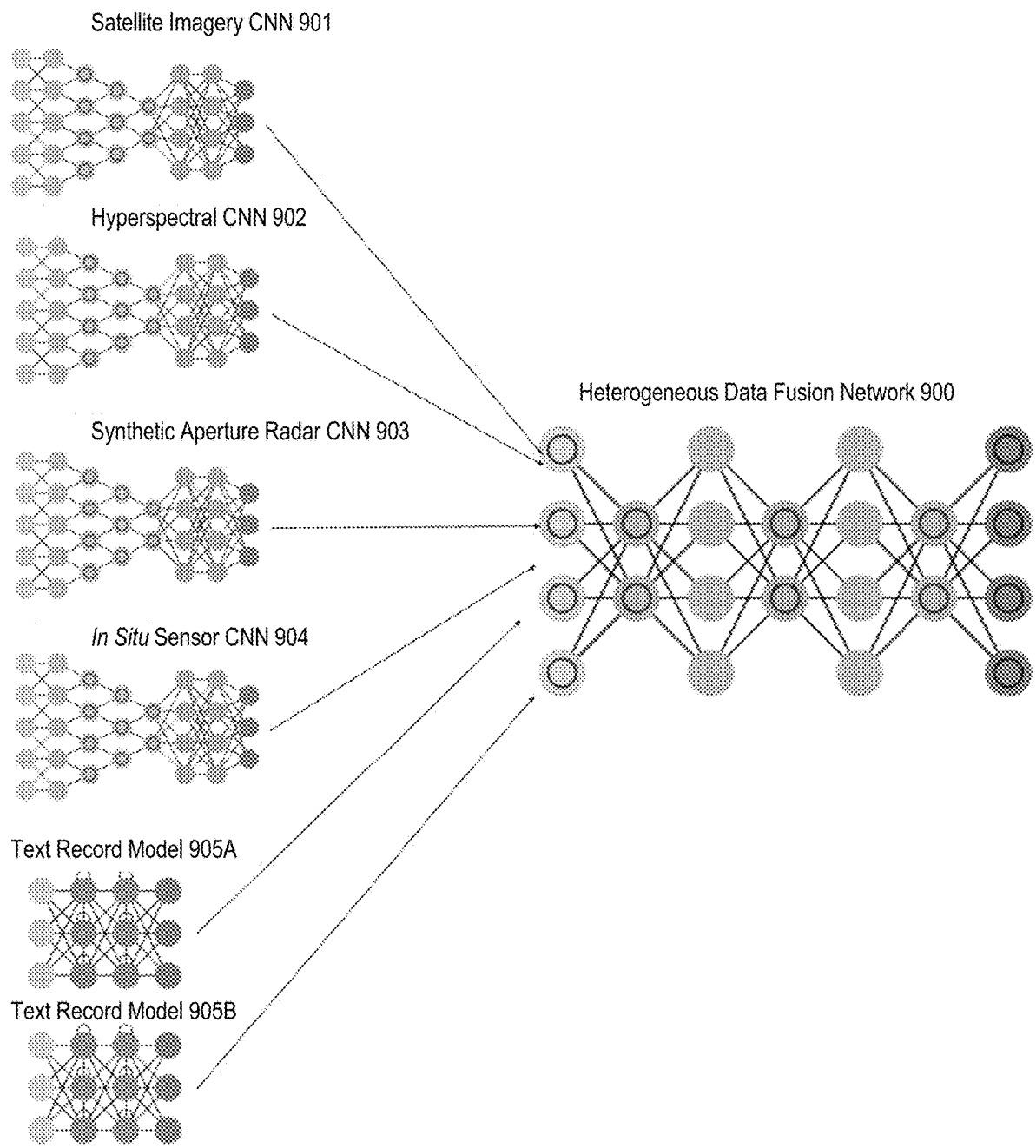
FIG. 9 illustrates data input to a heterogenous data fusion network according to aspects of the disclosure.

FIG. 9 illustrates data input to a heterogenous data fusion network 900 utilized by the server 404 according to aspects of the disclosure. Operations illustrated in FIG. 9 may be conducted in the environment of FIG. 4 and are described with reference to elements depicted in FIG. 4. In implementations, the server 404 utilizes convolutional neural networks (CNN) to process diverse types or categories of data, to extract insights from the data. In general, a CNN is a class of artificial neural network most commonly applied to analyze visual imagery, which includes an input layer, hidden layers (performing convolutions) and an output layer. By way of example, server 404 may utilize a satellite imagery CNN 901, a hyperspectral CNN 902, a synthetic aperture radar CNN 903, and an in situ sensor CNN 904. Additional machine learning models may be utilized in the heterogenous data fusion network 900, including text record models 905A and 905B, for example. In embodiments, outputs from the machine learning networks and models of the data fusion network 900 may be fed to other networks and models of the data fusion network 900 and/or combined by the server 404 to provide unique insights to users of the server 404. In embodiments, the machine learning models utilize natural language processing (NLP) tools and methods to generate insights from textual data.

In one example, the server 404 combines satellite imagery data insights from the Satellite Imagery CNN 901 with textual property record insights obtained from text record model 905A to generate a query output to a user, wherein the output identifies buildings and accurately estimates real estate value.

In a second example, the server 404 utilizes the heterogenous data fusion network 900 to combine hyperspectral remote sensing data insights from the Hyperspectral CNN 902, in situ temperature and soil moisture output data from the in situ sensor CNN 904, and insights derived from textual bills of sale by the Text Records Model 905B, to generate a prediction of expected yields and expected profits of a farming plot (AoI).

In a third example, the server 404 utilizes the heterogenous data fusion network 900 to combine synthetic aperture radar data outputs from the Synthetic Aperture Radar CNN 903, automatic identification system (AIS) data from a data provider device 406, and textual reports from observers (e.g., analyzed by Text Record Model 905A, or 905B) to determine if a ship is taking part in prohibited fishing activities.

Figure 10:
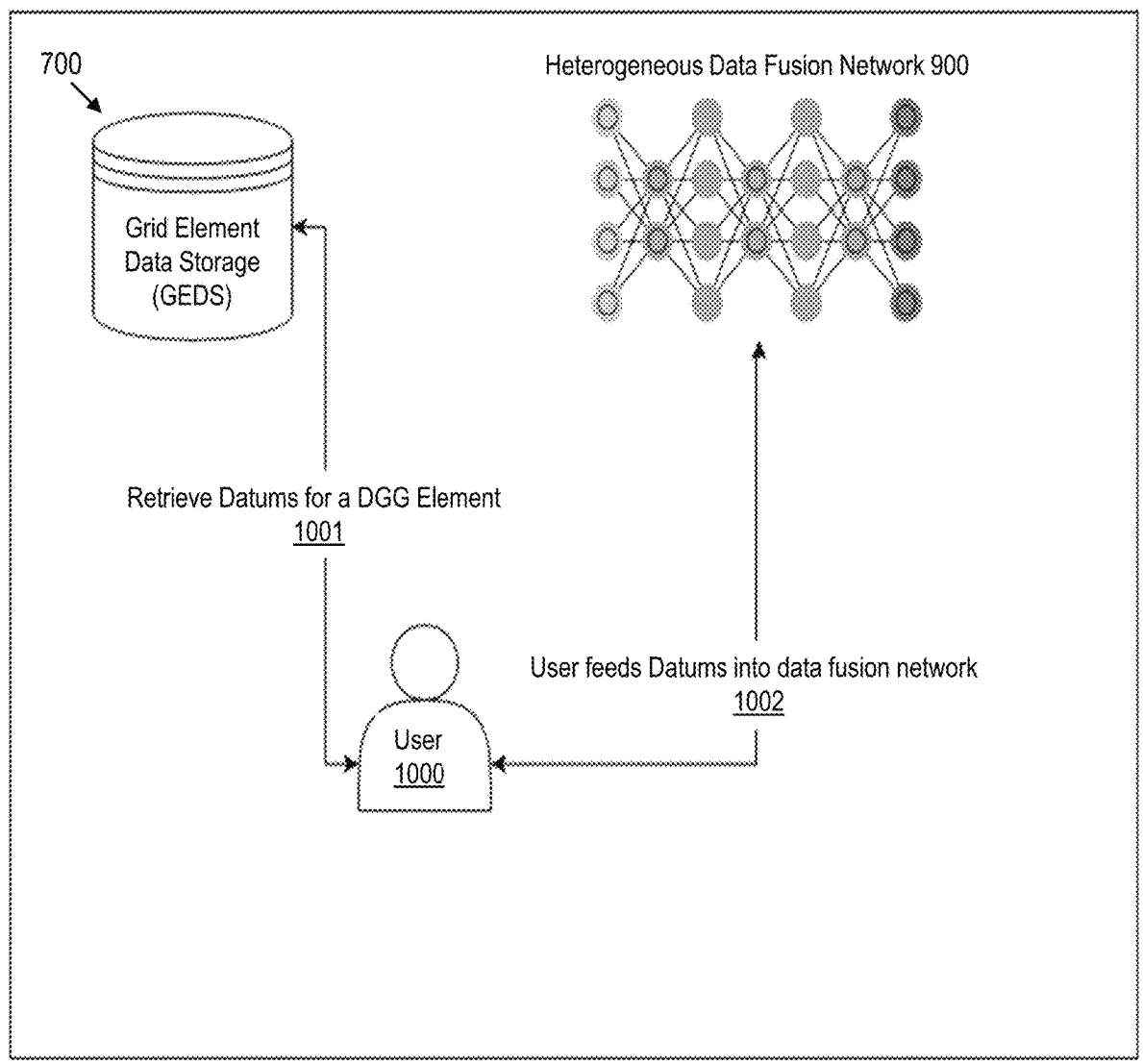
FIG. 10 illustrates a user query method according to aspects of the disclosure.

FIG. 10 illustrates a user query method according to aspects of the disclosure. Operations illustrated in FIG. 10 may be conducted in the environment of FIG. 4 and are described with reference to elements depicted in FIG. 4. In embodiments, a user 1000 (e.g., a user of a client device 408) retrieves Datums for a DGG grid element (e.g., DGG grid element 602 of FIG. 6) at 1001. The term Datum as used herein refers to an atomic piece of data about a DGG grid element. In implementations, the server 404 provides the user with the Datums in response to a search query input by the user 1000. In embodiment, the user feeds the retrieved Datums into the heterogenous data fusion network 900 of the server 404 to obtain insights (machine learning output(s)) based on the data. In implementations, the server 404 retrieves the Datums based on a search query input by the user 1000, and automatically feeds the Datums into one or more machine learning models or neural networks of the heterogenous data fusion network 900 to obtain one or more outputs based on store rules and a requested output of the user (e.g., an estimated real estate value, yield and profit predictions, identifications of ships taking part in prohibited fishing activities).

Figure 11:
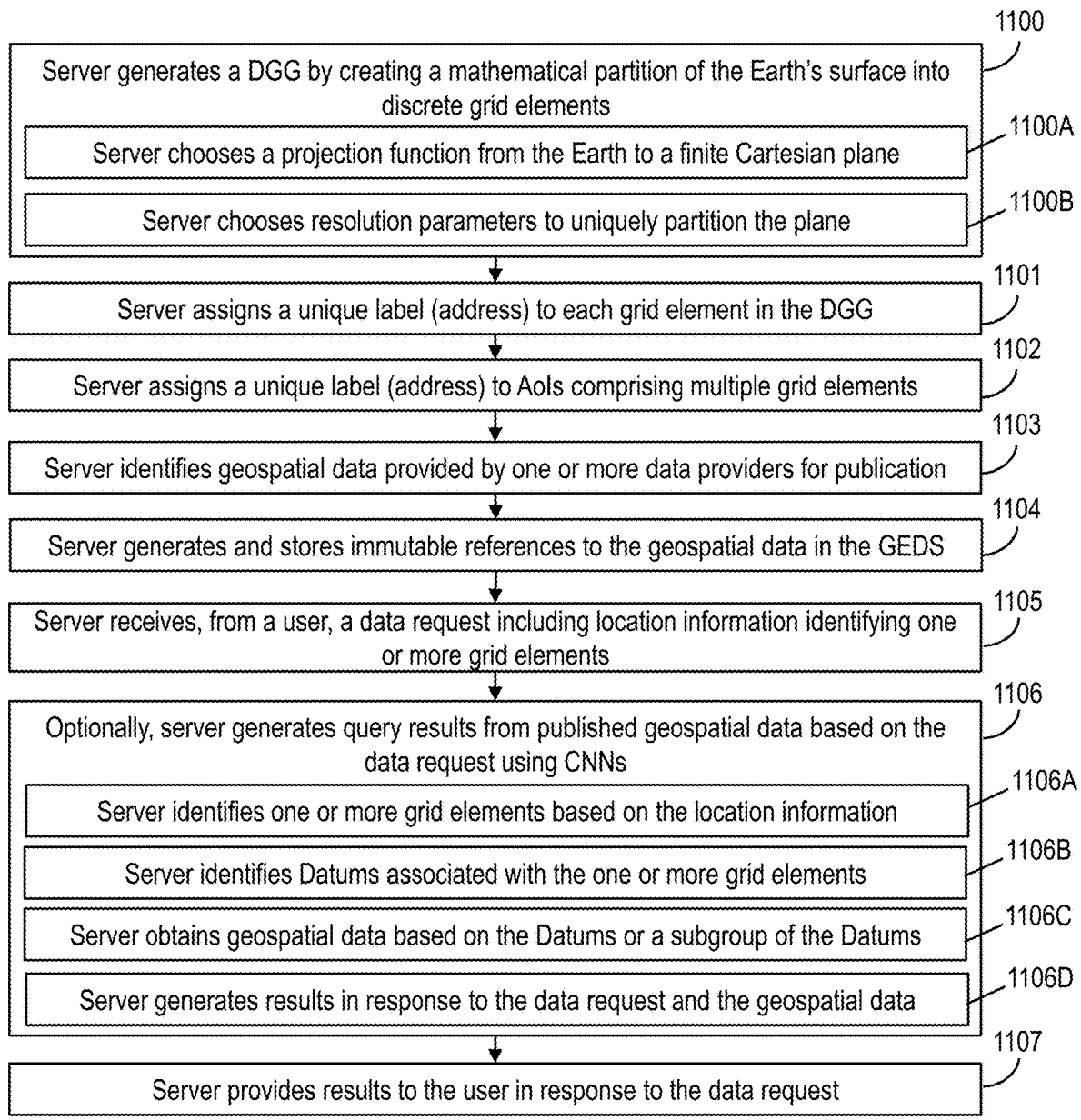
FIG. 11 shows a flowchart of an exemplary method in accordance with aspects of the disclosure.

FIG. 11 shows a flowchart of an exemplary method in accordance with aspects of the present disclosure. Operations of the method may be conducted in the environment of FIG. 4 and are described with reference to elements depicted in FIGS. 4-10.

At operation 1100, the server 404 generates a DGG by creating a mathematical partition of the Earth's surface into discrete grid elements such that any point on the Earth (globe) is contained in one and only one grid element. See DGG 600 of FIG. 6, for example. In embodiments, the HDGG module 420 of the server 404 implements operation 1100. In aspects of the disclosure, operation 1100 includes the following suboperations.

At suboperation 1100A, the server 404 chooses a projection function from the Earth ($S^2$) to a finite Cartesian plane ($R^2$). This function is diffeomorphic and takes each latitude and longitude point to a unique (x, y) point in the plane. Examples of projection functions include: equirectangular; mercator; loximuthal; equidistant conic; and stereographic. The plane is finite with a height h and a width w.

At suboperation 1100B, the server 404 chooses resolution parameters h' and w' such that h mod h'=0 and w mod w'=0. This operation uniquely partitions the plane.

At operation 1101, the server 404 assigns a unique label called an address to each grid element such that, given the latitude and longitude of a point on the Earth, the server 404 can determine the address of the grid element containing the given point. In implementations, the server 404 records the address in the GEDS 700. In embodiments, when the GEDS 700 is first instantiated, a record for each DGG grid element is created in the GEDS 700 by the server 404 using the unique label (address). Once these foundational records are created by the server 404, they cannot be deleted or altered in any way.

In embodiments, the server 404 calls the top left corner of the plane (0, 0). The server 404 identifies each grid component in the plane by its top left corner, for example (x, y), and each grid component is identified by the rectangle with corners (x, y), (x+w', y), (x, y+h'), (x+w', y+h'). The top left coordinate of the grid element (x, y) is concatenated into the string "x:y" and is used as the address of the grid element. With this configuration, for any point on the Earth the server 404 can find its address via projecting the latitude and longitude of that point in the same fashion as above and then determining which grid element the resulting Cartesian point belongs to. In embodiments, the HDGG module 420 of the server 404 implements operation 1001.

Optionally, at operation 1102, the server 404 assigns a unique label (address) to AoIs comprised of more than one grid element (e.g., a group of grid element 604 of FIG. 6), thereby forming a Hierarchical DGG (HDGG). AoIs can be any geographic area of interest defined by a user of the server 404. AoIs may contain stationary objects of interest therein such as farms or towns, or mobile objects such as ships. In implementations, the server 404 stores AoI addresses in the GEDS 700. In embodiments, the HDGG module 420 of the server 404 implements operation 1102.

In implementations, the server 404 is configured to index, store, and prove the provenance of any and all kinds of data that reference any given DGG grid element (e.g., grid element 602 of FIG. 6). Accordingly, at operation 1103, the server 404 identifies geospatial data (a data asset) provided by one or more data providers (e.g., via data provider device(s) 406) for publication by the server 404. The term geospatial data as used here refers to data that pertain to one or more geographic points in one or more DGG grid elements of the DGG. In embodiments data providers register with the server 404 (e.g., via a UI provided by the server 404) and provide the server 404 with registration information about the providers. In implementations, server 404 obtains verification data during a registration or data publication process to verify the source and content of the geospatial data to be published. (e.g., a public encryption key of the provider).

In implementations, when a data provider wishes to publish geospatial data to the server 404, they must submit a cryptographically signed checksum of the underlying data asset (i.e., satellite image, text file, PDF, sensor data spreadsheet, etc.). In implementations, the data provider uses a cryptographic hash function to calculate a checksum for the geospatial data, and uses a private encryption key to create a digital signature of the checksum. See the method described below with respect to FIG. 12. In embodiments, the server 404 obtains the checksum and the cryptographic hash function from the data provider at operation 1103, and stores them in the GEDS 700. In aspects of the disclosure the server 404 determines a remote storage location of geospatial data provided by a data provider. In implementations, the server 404 obtains the geospatial data from the data provider, and optionally stores the geospatial data in a data store of the server 404.

At operation 1104, the server 404 generates and stores immutable references to the geospatial data identified at operation 1103 in the GEDS 700, wherein the references link the geospatial data to one or more DGG grid elements. Examples of the diverse types and natures of geospatial data referenced in the GEDS 700 include, but are not limited to: satellite imagery; remote sensor measurements; in situ sensor measurements; and text-based records.

In implementations, the immutable references are in the form of Datums. As noted above, a Datum is an atomic piece of data about a DGG grid element. In implementations, a Datum comprises: a pointer to the address of the DGG grid element; a public key of the entity publishing the information (data provider); a location of the data (in local or remote data storage); a checksum of the data signed using the data publisher's private key; and optionally, metadata (e.g., timestamps, data type, sensors used, data schemas, access protocols, etc.) providing data about the Datum. The term pointer as used herein refers to a software program object that stores a memory address. The term checksum as used herein refers to a small-sized block of data derived from another block of digital data for the purpose of verification or detecting errors that may have been introduced during its transmission or storage. In implementations, the server 404 obtains the checksum for the geospatial data from the data provider as part of the data publication process of the server 404. In embodiments, the GEDS 700 provides an index for all Datums referring to a specified DGG address. Once a Datum is registered to an address in the GEDS 700 it cannot be unregistered, which prevents tampering with or altering data after publication of the data by the server 404. In embodiments, the GEDS module 421 implements operation 1003.

At operation 1105, the server 404 receives, from a user (e.g., a user of client device 408) a data request (via a UI provided by the server 404) including location information identifying one or more grid elements. Location information may be in the form of and address of the one or more grid elements, or may be in the form of other location information that can be utilized by the server 404 to identify one or more grid elements, such as latitude and longitude, global positioning system (GPS) data, etc. In embodiments, the query module 425 of the server 404 implements operation 1105.

Given the free form nature of what the underlying linked data of a Datum record represents, in implementations, the server 404 provides users with the ability to synthesis geospatial data of distinct types into cohesive insights. In implementations, the data request from the user is a request for available geospatial data associated with the one or more grid elements. In other implementations, the data request includes a query for information that is generated by the server 404. The data request may identify a type of information requested (e.g., satellite data) or a category of information requested (e.g., prediction of expected yields and expected profits). In embodiments, the type of data requested requires the synthesis of at least two distinct categories or types of data.

Accordingly, at operation 1106, the server 404 optionally generates query results in response to the data request of the user using CNNs (e.g., the heterogeneous data fusion network 900). The neural network architecture discussed herein is designed to perform heterogeneous data fusion (i.e., meld a myriad of disparate types of data), in a way that allows for unique insights to be derived. In implementations, the heterogeneous data fusion network 900 is a fully connected neural network where the input layer is connected upstream to data specific neural networks (e.g., a satellite imagery CNN 901 for performing image segmentation). The number of layers in the heterogeneous data fusion network 900 and the number of nodes in the output layer is determined by the use case. Operation 1106 may be implemented by the following suboperations.

In suboperation 1106A, the server 404 identifies one or more grid elements based on the location information in the data request.

At suboperation 1106B, the server 404 identifies all Datums associated with the one or more grid elements.

At suboperation 1106C, the server 404 obtains geospatial data based on (associated with) the Datums or a subgroup of the Datums. In embodiments, the server 404 filters the Datums and/or geospatial data by categories or type of data, based on the data request of the user.

At suboperation 1106D, the server 404 utilizes machine learning (e.g., the heterogenous data fusion network 900) and the geospatial data obtained at suboperation 1106C to generate results in response to the data request. In implementations, the server 404 coalesces all Datums for a GEDS element; trains convolutional neural networks (CNNs) to understand a segmentation of image, radar, and sensor data; trains neural network language models to understand semantic and ontological features of text data concerning the DGG grid element; and/or combines Datum model outputs into a fusion network to learn insights. See, for example, the examples discussed with respect to FIG. 9.

At operation 1107, the server 404 provides results to the user in response to the data request. In implementation, the results comprise references or links to the location of geospatial data associated with the location information (e.g., one or more grid elements), wherein the user may access the geospatial data based on the references. In other implementations, the results comprise the geospatial data (e.g., satellite images, sensor data, text documents, etc.) associated with the location information. In embodiments, the results include information generated by the server 404 using machine learning methods (e.g., using the heterogenous data fusion network 900). In aspects of the disclosure, access controls for the actual geospatial data (data asset) are considered to be the purview of the data publisher and thus, while a Datum is available to every user of the server 404, the underlying data asset is not available via the server 404. In embodiments, the query module 425 of the server 404 implements operation 1107. Exemplary use cases include the following.

Predicting the Price of Commodity Futures

In a first use scenario, a CNN is trained using hyperspectral satellite imagery to determine the overall health of corn crops in the United States. A long short-term memory (LSTM) network is trained to predict heavy rains which effect corn harvests. A recurrent neural network (RNN) language model is trained to understand current corn contracts. In this scenario, the heterogeneous data fusion network 900 takes the output of these machine learning networks and predicts the size of the future corn crop.

Wildfire Insurance Risk Management

A CNN is trained using optical satellite imagery to predict the density of vegetation in wildfire prone areas. A RNN language model is trained to understand property and other records. In this scenario, the heterogeneous data fusion network 900 is able to estimate the risk profile for wildfire insured homes using outputs of the CNN and RNN.

Tracking Marine Debris

A CNN is trained using synthetic aperture radar data to detect where the Great Pacific Garbage Patch is. A CNN is trained on geo-tagged images from ships to determine the density of the garbage patch. A LSTM network is trained on current ocean current measurements to determine future current flows. In this scenario, the heterogeneous data fusion network 900 is able to estimate where the garbage patch will move to, and how the density will change over time using the outputs of the above-identified machine learning networks.

Figure 12:
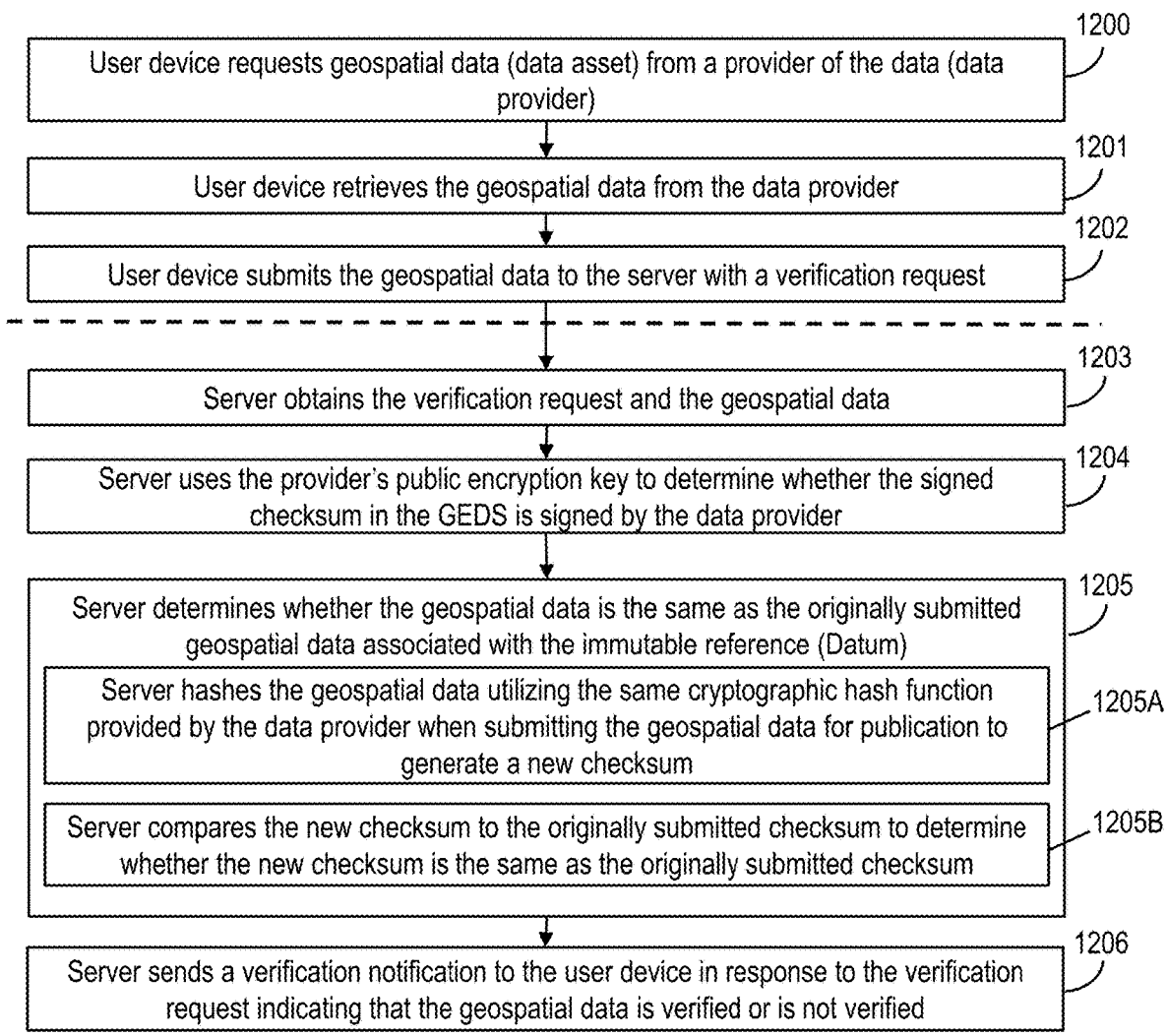
FIG. 12 shows a flowchart of an exemplary verification method in accordance with aspects of the present disclosure.

FIG. 12 shows a flowchart of an exemplary verification method in accordance with aspects of the present disclosure. Operations of the method may be conducted in the environment of FIG. 4 and are described with reference to elements depicted in FIG. 4.

Given a Datum, any user with proper access credentials to the linked data can verify its validity. Presently, it is practically impossible to forge a digital signature, but it is quite easy to check that a digital signature is valid. Similarly, it is mathematically improbable that two different files that look the same will have the same checksum. Since the record of Datums is immutable on the server 404, embodiments of the disclosure enable a user to ensure that the data asset they received is precisely the one the data provider made an attestation about during publication with the server 404, and has not been altered in any way.

In implementations, at operation 1200, a user device (e.g., client device 408) requests geospatial data (a data asset) from a provider of the geospatial data. In embodiments, a client device 408 of the user sends the request to a data provider device 406 of the provider of the geospatial data. In implementation, the user uses the results obtained by the server at operation 1107 of FIG. 11 to obtain the geospatial data. In aspects, the user obtains the Datum associated with geospatial data from the server 404 according to operation 1107 of FIG. 11, and submits the Datum to the provider at operation 1200 in order to identify the geospatial data to be obtained.

At operation 1201, the user device receives the requested geospatial data from the provider. By way of example, the data provider may provide a satellite image to the user device in response to the request at operation 1200.

At operation 1202, the user device submits the geospatial data to the server 404 with a verification request. The user device may submit the geospatial data directly, or provide the server 404 with a link to the geospatial data, wherein the link enables the server 404 to obtain the geospatial data from a data store. In embodiments, the verification request includes the Datum associated with the geospatial data.

At operation 1203, the server 404 receives the verification request and obtains the geospatial data, either directly from the user device or from a remote data store, based on the verification request.

At operation 1204, the server 404 obtains the data provider's public encryption key and determines whether the signed checksum in the GEDS 700 associated with the geospatial data is signed by the data provider (using their private encryption key). In implementations, the server 404 obtains the data provider's public encryption key using the data provider's registration information or information obtained from the data provider at the time the geospatial data at issue was published to the server 404.

At operation 1205, the server 404 determines whether the geospatial data is the same as the original geospatial data submitted for publication by the server 404. In implementations, operation 1205 is implemented using the following suboperations.

At suboperation 1205A, the server 404 accesses the cryptographic hash function associated with the geospatial data in the GEDS 700, and hashes the geospatial data obtained at operation 1203 to generate a new checksum.

At suboperation 1205B, the server 404 compares the new checksum with the original checksum for the geospatial data of interest submitted by the provider during the publication process in order to determine whether the new checksum is the same as the original checksum (i.e., the data is valid).

At operation 1206, the server 404 sends a verification notification to the user device (e.g., client device 408) in response to the verification request, which indicates whether the geospatial data submitted by the user for verification at operation 1202 is valid. In implementations, in response to the server 404 determining that the data provider of the geospatial data submitted for verification signed the checksum, and determining that the new checksum matches the originally submitted checksum, the server 404 sends a verification notification to the user confirming that the geospatial data submitted for verification is valid. Alternatively, in response to the server 404 determining that either the data provider of the geospatial data submitted for verification did not sign the checksum, or determining that the new checksum does not match the originally submitted checksum, the server 404 sends a verification notification to the user indicating that the geospatial data submitted for verification is not valid.

In embodiments, a service provider could offer to perform the processes described herein. In this case, the service provider can create, maintain, deploy, support, etc., the computer infrastructure that performs the process operations of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the disclosure provides a computer-implemented method, via a network. In this case, a computer infrastructure, such as computer system/server 12 (FIG. 1), can be provided and one or more systems for performing the processes of the disclosure can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the disclosure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    identifying, by a computing device, geospatial data of a data provider, wherein the geospatial data is associated with a grid element of a discrete global grid (DGG), and wherein source and content of the geospatial data is verifiable using a cryptographically signed checksum submitted by the data provider;
    generating, by the computing device, in a grid element data store, an immutable reference in time to the geospatial data, the immutable reference including a pointer to a unique label of the grid element of the DGG and a storage location of the geospatial data;
    receiving, by the computing device, a data request from a user, the data request including location information identifying the grid element;
    providing, by the computing device, a response to the user including the storage location of the geospatial data associated with the grid element to enable access of the geospatial data by the user; and
    in response to a verification request from the user, determining, by the computing device, whether accessed geospatial data is the same as the geospatial data associated with the immutable reference by generating a new checksum by hashing the accessed geospatial data using the cryptographically signed checksum and comparing the new checksum thereto.

2. The method of claim 1, wherein the immutable reference further includes a public key of the data provider.

3. The method of claim 1, wherein the immutable reference further includes the cryptographically signed checksum signed using the data provider's private key.

4. The method of claim 3, further comprising verifying, using the cryptographically signed checksum, that the geospatial data of the data provider has not changed since the generation of the immutable reference in time.

5. The method of claim 1, wherein the immutable reference further includes metadata providing data regarding the geospatial data of the data provider.

6. The method of claim 1, further comprising:
    generating, by the computing device, the DGG by creating a mathematical partition of the Earth's surface into discrete grid elements; and
    assigning, by the computing device, unique labels to each of the grid elements.

7. The method of claim 1, further comprising:
    receiving, by the computing device, a request for information, the request for information including location information identifying one or more grid elements of the DGG;
    obtaining, by the computing device, geospatial data associated with the one or more grid elements based on immutable references in the grid element data store;
    inputting, by the computing device, the geospatial data associated with the one or more grid elements into a convolutional neural network (CNN) to generate an output providing insights based on the geospatial data associated with the one or more grid elements; and
    sending, by the computing device, a response to the request for information based on the output of the CNN.

8. The method of claim 7, wherein the geospatial data of the data provider comprises one or more heterogeneous data selected from of the group consisting of: satellite imagery data; remote sensor data; in situ sensor data; and text-based documents.

9. The method of claim 1, wherein the computing device includes software provided as a service in a cloud environment.

10. A computer program product comprising one or more computer readable storage media having program instructions collectively stored on the one or more computer readable storage media, the program instructions executable to:
    identify geospatial data of a data provider, wherein the geospatial data is associated with a grid element of a discrete global grid (DGG), and wherein source and content of the geospatial data is verifiable using a cryptographically signed checksum submitted by the data provider;
    generate in a grid element data store, an immutable reference in time to the geospatial data, the immutable reference including: a pointer to a unique label of the grid element of the DGG, a storage location of the geospatial data, and a public key of the data provider;
    receive a data request from a user, the data request including location information identifying the grid element;
    provide a response to the user including the storage location of the geospatial data associated with the grid element to enable access of the geospatial data by the user; and
    in response to a verification request from the user, determining whether accessed geospatial data is the same as the geospatial data associated with the immutable reference by generating a new checksum by hashing the accessed geospatial data using the cryptographically signed checksum and comparing the new checksum thereto.

11. The computer program product of claim 10, wherein the immutable reference further includes the cryptographically signed checksum signed using the data provider's private key.

12. The computer program product of claim 11, wherein the program instructions are further executable to verify, using the cryptographically signed checksum, that the geospatial data of the data provider has not changed since the generation of the immutable reference in time.

13. The computer program product of claim 10, wherein the immutable reference further includes metadata providing data regarding the geospatial data of the data provider.

14. The computer program product of claim 10, wherein the program instructions are further executable to:
    generate the DGG by creating a mathematical partition of the Earth's surface into discrete grid elements; and
    assign unique labels to each of the grid elements.

15. The computer program product of claim 10, wherein the program instructions are further executable to:
- receive a request for information, the request for information including location information identifying one or more grid elements of the DGG;
- obtain geospatial data associated with the one or more grid elements based on immutable references in the grid element data store;
- input the geospatial data associated with the one or more grid elements into a convolutional neural network (CNN) to generate an output providing insights based on the geospatial data associated with the one or more grid elements; and
- send a response to the request for information based on the output of the CNN, wherein the geospatial data of the data provider comprises one or more heterogeneous data selected from of the group consisting of: satellite imagery data; remote sensor data; in situ sensor data; and text-based documents.

16. A system comprising:
- a processor, one or more computer readable storage media, and program instructions collectively stored on the one or more computer readable storage media, the program instructions executable to:
- generate a discrete global grid (DGG) by creating a mathematical partition of the Earth's surface into discrete grid elements;
- assign unique labels to each of the grid elements;
- identify geospatial data of a data provider, wherein the geospatial data is associated with a grid element of the DGG, and wherein source and content of the geospatial data is verifiable using a cryptographically signed checksum submitted by the data provider;
- generate in a grid element data store, an immutable reference in time to the geospatial data, the immutable reference including: a pointer to a unique label of the grid element of the DGG, a storage location of the geospatial data, a public key of the data provider, and the cryptographically signed checksum signed using the data provider's private key;
- receive a data request from a user, the data request including location information identifying the grid element;
- provide a response to the user including the storage location of the geospatial data associated with the grid element to enable access of the geospatial data by the user; and
- in response to a verification request from the user, determining whether accessed geospatial data is the same as the geospatial data associated with the immutable reference by generating a new checksum by hashing the accessed geospatial data using the cryptographically signed checksum and comparing the new checksum thereto.

17. The system of claim 16, wherein the program instructions are further executable to:
- verify, using the cryptographically signed checksum, that the geospatial data of the data provider has not changed since the generation of the immutable reference in time.

18. The system of claim 16, wherein the immutable reference further includes metadata providing data regarding the geospatial data of the data provider.

19. The system of claim 16, wherein the program instructions are further executable to:
- receive a request for information, the request for information including location information identifying one or more grid elements of the DGG;
- obtain geospatial data associated with the one or more grid elements based on immutable references in the grid element data store;
- input the geospatial data associated with the one or more grid elements into a convolutional neural network (CNN) to generate an output providing insights based on the geospatial data associated with the one or more grid elements; and
- send a response to the request for information based on the output of the CNN.

20. The system of claim 16, wherein the geospatial data of the data provider comprises one or more heterogeneous data selected from of the group consisting of: satellite imagery data; remote sensor data; in situ sensor data; and text-based documents.

* * * * *